United States Patent [19]
Han

[11] Patent Number: 5,809,088
[45] Date of Patent: Sep. 15, 1998

[54] DIGITAL CARRIER WAVE RESTORING DEVICE AND METHOD FOR USE IN A TELEVISION SIGNAL RECEIVER

[75] Inventor: Dong-Seog Han, Ahnyang, Rep. of Korea

[73] Assignee: Samsung Electronics Co., Ltd., Kyungki-do, Rep. of Korea

[21] Appl. No.: 679,265

[22] Filed: Jul. 12, 1996

[30] Foreign Application Priority Data

Jul. 14, 1995 [KR] Rep. of Korea ............... 1995 20772
Nov. 24, 1995 [KR] Rep. of Korea ............... 1995 43526

[51] Int. Cl.[6] ................................................. H04L 27/06
[52] U.S. Cl. ................... 375/344; 455/192.3; 455/192.2
[58] Field of Search ...................... 375/344, 340, 375/261, 329, 279, 363, 373, 375, 376; 370/522, 526, 527; 455/192.2, 192.3, 182.2, 182.3, 209, 345

[56] References Cited

U.S. PATENT DOCUMENTS

| | | | |
|---|---|---|---|
| 5,398,080 | 3/1995 | Sakashita et al. | 455/182.2 |
| 5,450,447 | 9/1995 | Dutta | 455/182.2 |
| 5,487,186 | 1/1996 | Scarpa | 455/192.2 |
| 5,488,629 | 1/1996 | Takahashi et al. | 375/206 |
| 5,528,633 | 6/1996 | Halik et al. | 375/344 |
| 5,638,140 | 6/1997 | Krishnamurthy et al. | 455/192.2 |
| 5,699,385 | 12/1997 | D'Sylva et al. | 375/344 |
| 5,715,281 | 3/1998 | Bly et al. | 375/344 |

*Primary Examiner*—Chi H. Pham
*Assistant Examiner*—Emmanuel Bayard
*Attorney, Agent, or Firm*—Sughrue, Mion, Zinn, Macpeak & Seas, PLLC

[57] ABSTRACT

A digital carrier wave restoring device for use in a telecommunication receiving system which utilizes a pilot signal: frequency-converts an output signal of a filter to a digital signal processing frequency band; phase-splits the digital signal to output a first I signal and a first Q signal; low-pass filters and phase-splits the digital signal to output a second I signal and a second Q signal; mixes the first I signal and the first Q signal with a fixed local oscillation frequency to output a first I signal and a first Q signal of a baseband; mixes the second I signal and the second Q signal with the fixed local oscillation frequency to output a second I signal and a second Q signal of a baseband; and detects a frequency error and a phase error to generate an error correction value for correcting the frequency error and the phase error, and for applying to a tuning unit a second tuning frequency which is obtained by adding a preliminary correction frequency value to the error correction value, to thereby cause the tuning unit to correct a first tuning frequency.

14 Claims, 7 Drawing Sheets

5,809,088

DIGITAL CARRIER WAVE RESTORING DEVICE AND METHOD FOR USE IN A TELEVISION SIGNAL RECEIVER

BACKGROUND OF THE INVENTION

1. Field of the Invention

The present invention relates to a television signal receiving system, and more particularly to a carrier wave restoring device for use in a high density television receiver for compensating a frequency and phase offset of a carrier wave signal by utilizing a pilot signal, to thereby cause only a precise frequency band of the carrier wave signal to pass.

The present invention for a digital carrier wave restoring device method, is based on Korean Application No. 20772/1995, which is incorporated herein by reference for all purposes.

2. Description of the Related Art

In a telecommunication method by which a pilot signal is included with a carrier wave, there are a vestigial side band (VSB), a double side band (DSB), and a single side band (SSB). The pilot signal is included with the carrier wave at the time of transmitting so that the carrier wave can be precisely restored. One embodiment of a telecommunication device which restores a carrier signal using a pilot signal is illustrated in FIG. 1.

FIG. 1 depicts a tuning unit, an intermediate frequency (IF) unit and a carrier wave restoring device, for use in a high definition television receiver using an 8-level vestigial side band (VSB) according to a United States standard. The VSB HD TV receiver of FIG. 1 is disclosed in "Guide to the Use of the Digital Television For High Definition Television (HDTV) Transmission", p100, published by the United States Advanced Television System Committee on Apr. 12, 1995.

Operation of the receiver will now be described with reference to FIG. 1. A radio frequency (RF) signal received through an antenna is applied to a double conversion tuner 2. The double conversion tuner 2 tunes the received RF signal by a fixed local oscillation signal LO1 which is generated by a frequency synthesizer 8, to thereby convert the tuned signal to a first IF signal of 920 MHz. At this time, the double conversion tuner 2 controls the gain control of an output signal in response to an auto gain control (AGC) of the receiver. The IF signal outputted from the double conversion tuner 2 is filtered as the IF signal of a specific bandwidth through a surface acoustic wave (SAW) filter 4. Referring to a frequency spectrum illustrated in FIG. 3, the SAW filter 4 filters the IF signal to an IF signal having a bandwidth of, for example, 6 MHz extending from 41 to 47 MHz. An example of the positioning of the pilot signal is illustrated where the pilot signal is positioned at the 3 dB upper cutoff frequency of the IF signal output by the SAW filter 4.

The IF signal of 6 MHz bandwidth passing through the SAW filter 4 is amplified in an IF amplifier 6 and then applied to the carrier wave restoring device 10. At this time, an amplification gain is determined by the auto gain control AGC outputted from the receiver.

The carrier wave restoring device 10 of the receiver of FIG. 1 is generally called a frequency & phase locked loop (hereinafter, referred to as "FPLL"). The carrier wave restoring device 10 extracts a frequency error and a phase error from a demodulated baseband signal, to thereby provide the local oscillation signal LO2 to the double conversion tuner 2. The double conversion tuner 2 uses the local oscillation signal LO2 to precisely correct the tuning which results from application of the local oscillation signal LO1 to the tuner 2. Particulars of the carrier wave restoring device 10 are disclosed in "IEEE Trans. on Consumer Electronics" Vol. CE-23 NO 3, p358 to p365.

Following is a detailed description of the operation of the carrier wave restoring device 10. The local oscillator 12 of the carrier wave restoring device 10 generates the local oscillation signal LO3 of a specific frequency for frequency-converting the IF signal outputted from the IF amplifier 6 to the baseband. The local oscillation signal LO3 is phase-shifted by 90° in a phase shifter 14 and then is applied to a first mixer 16. On the other hand, the local oscillation signal LO3 is directly applied to a second mixer 18.

Accordingly, the amplified IF signal outputted from the IF amplifier 6 is multiplied (tuned) to the local oscillation signal LO3 phase-shifted by 90° in the first mixer 16, and then is frequency-converted to the baseband signal through a first low pass filter 20. Also, the amplified IF signal is multiplied (tuned) to the local oscillation signal LO3 in the second mixer 18 and then is frequency-converted to the baseband signal through a second low pass filter 22. Here, an I signal is outputted from the first mixer 16, and a Q signal is outputted from a second mixer 18. The first low pass filter 20 eliminates a secondary harmonic component (a video frequency component) of the I signal and allows only the baseband signal of the I signal to pass. In the same manner, the second low pass filter 22 eliminates the secondary harmonic component (the video frequency component) of the Q signal and allows only the baseband signal of the Q signal to pass.

At this time, in the baseband signal of the I signal which is inputted to the first low pass filter 20, the pilot signal is positioned at zero Hz when tuning is precisely performed in the double conversion tuner 2, and the pilot signal is positioned at a positive or negative baseband when the tuning is not precisely performed. At this time, in the case that the SAW filter 4 cannot filter the pilot signal, it should be noted that the carrier wave cannot be restored in the carrier wave restoring device 10. Accordingly, when the pilot signal is positioned at the positive or negative baseband, a frequency offset (that is, a difference between demodulated frequencies of the carrier wave) is generated. The frequency offset is generated because the frequency which is actually tuned in the double conversion tuner 2 is different from the frequency which should be tuned.

When a frequency offset is generated, the output signal (I signal) of the first low pass filter 20 is a cosine wave, and the output signal (Q signal) of the second low pass filter 22 is a sine wave. At this time, the output signal (I signal) of the first low pass filter 20 is converted to a sine wave through an auto frequency control low pass filter (hereinafter, referred to as "AFC LPF") 24 and a limiter 26. The AFC LPF 24 can make the pilot signal of the output signal (I signal) of the first low pass filter 20 follow the frequency to be detected. A signal having a value which varies between +1 or −1 due to the frequency error is outputted from the limiter 26.

An output signal of the limiter 26 is multiplied with the output signal (Q signal; sine wave) of the second low pass filter 22 in the mixer 30 and is converted to a direct current (DC) signal. The DC signal passes through an auto phase control low pass filter (hereinafter, referred to as "APC LPF") 32 and controls a voltage controlled oscillator (hereinafter, referred to as "VCO") 34 in order to eliminate the frequency error. The VCO 34 responds to a frequency error eliminating control signal of the APC LPF 32, so that the local oscillation signal LO2 is inputted to the double conversion tuner 2.

If the frequency error is entirely eliminated by the above control, the output signal of the limiter 26 is fixed as +1 or −1 signal and does not change with time. This means that there is no frequency error. Only the output of the second low pass filter 22 acts in the mixer 30, so that the carrier wave restoring device 10 acts as a phase locked loop (hereinafter, referred to as "PLL"). At this time, the output of the mixer 30 passes through the APC LPF 32 and controls the VCO 34, to thereby eliminate a vestigial phase error.

Summarizing the operation of the carrier wave restoring device 10, the carrier wave signal, the demodulating frequency signal and the frequency offset are extracted, and one loop acts to correct the frequency error, and the other loop automatically traces the phase error.

In the carrier wave restoring device 10 of FIG. 1, a frequency pull-in range is a relatively narrow +100 KHz to −100 KHz. The pilot signal transmitted for restoring the carrier wave should be extracted from the frequency bandwidth of 6 MHz according to the filtering characteristic of the SAW filter 4. Therefore, the signal of the frequency bandwidth of 6 MHz except for the pilot signal in the signal inputted to the AFC LPF 24 has a noisy component with respect to the pilot signal.

Also, because only the signal having the exact 6 MHz bandwidth passes through the SAW filter 4, and because the pilot signal is outside this bandwidth, the offset of the carrier wave is too great for the carrier wave restoring device 10 to locate the pilot signal, making it impossible to restore the carrier wave.

SUMMARY OF THE INVENTION

It is an object of the present invention to provide a digital carrier wave restoring device and method for easily restoring a carrier wave even though a frequency offset is very large.

It is another object of the present invention to provide a digital carrier wave restoring device and method for restoring a carrier wave by digital processing.

It is a further object of the present invention to provide a digital carrier wave restoring device and method for previously shifting and tuning a frequency, thereby to correct a frequency offset.

It is a still further object of the present invention to provide a digital carrier wave restoring device and method for optionally varying a frequency pull-in range for restoring a carrier wave.

To achieve this and other objects, there is provided a digital carrier wave restoring device of a receiving system which utilizes a telecommunication method having a pilot signal, comprising: a tuning unit for receiving a radio signal including the pilot signal, and tuning the radio signal to a first tuning frequency corresponding to a channel selected by a user, to thereby output an intermediate frequency signal therefrom; a filter for filtering the intermediate frequency signal to a specific frequency bandwidth through which the pilot signal passes; a first frequency converter for frequency-converting an output signal of the filter to a digital signal processing frequency band; a signal converter for converting an output signal of the first frequency converter to a digital signal; a first phase splitter for phase-splitting the digital signal, to thereby output a first I signal and a first Q signal therefrom; a low pass filter and second phase splitter for low pass-filtering and phase-splitting the digital signal, to thereby output a second I signal and a second Q signal therefrom; a second frequency converter for mixing the first I signal and the first Q signal with a fixed local oscillation frequency, to thereby output a first I signal and a first Q signal of a baseband therefrom; a third frequency converter for mixing the second I signal and the second Q signal with the fixed local oscillation frequency, to thereby output a second I signal and a second Q signal of a baseband therefrom; and a tuning correcting unit for detecting a frequency error by the pilot signal of the second I signal of the baseband and detecting a phase error from the second Q signal of the baseband, to thereby generate an error correction value for correcting the frequency error and the phase error, and for applying to the tuning unit a second tuning frequency which is obtained by adding a preliminary correction frequency value prepared for an initial shifting of the first tuning frequency to the error correction value, to thereby cause the tuning unit to correct the first tuning frequency.

In preparation for shifting the tuning of a carrier wave, a frequency-conversion is performed by previously shifting a frequency by an amount equal to and in a direction opposite a frequency deviation, so that a pilot signal exists within a bandwidth corresponding to a baseband of a bandwidth of a SAW filter and a bandwidth of a low pass filter.

BRIEF DESCRIPTION OF THE DRAWINGS

The following is a detailed description of the invention by the reference of the attached drawings, in which like numbers indicate the same or similar elements.

DETAILED DESCRIPTION OF THE PREFERRED EMBODIMENT

In the following, a preferred embodiment according to the present invention will be described in detail with reference to the attached drawings.

For a clear understanding of the present invention, a frequency spectrum will be described with reference to FIGS. 3, 4 and 5.

Figure 3:
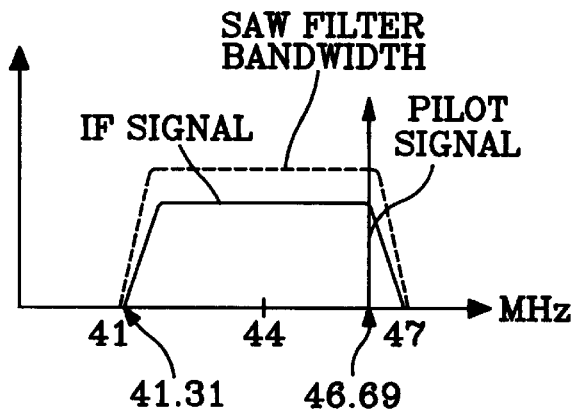
FIG. 3 is a frequency spectrum diagram illustrating a pilot signal of an intermediate frequency (IF) signal existing within a bandwidth of a surface acoustic wave (SAW) filter in the case that a carrier wave tuning is ideal.

In the present invention, it is assumed that a 3 dB frequency band of an intermediate frequency (IF) signal passing through a double conversion tuner 2 is between 41.31 to 46.69 MHz as illustrated in FIG. 3. Also, it is assumed that a pilot signal has a frequency of 46.69 MHz. This is the standard for the United States 8-level vestigial side band high definition television.

Accordingly, if the IF signal passes through a SAW filter 4, signals having a frequency outside the 41.31 to 46.69 MHz band of the IF signal are entirely eliminated. However, if the IF signal initially tuned and frequency-converted by the double conversion tuner 2 deviates by as much as 0.3 MHz band (that is, a middle frequency 44 MHz of the IF signal is changed to 44.3 MHz) as illustrated in FIG. 4, the pilot signal is not within a 3 dB filtering bandwidth of the SAW filter 4. Referring to FIG. 4, the pilot signal then has a frequency of 46.99 MHz and is not within the 3 dB filtering bandwidth of the SAW filter 4.

Figure 4:
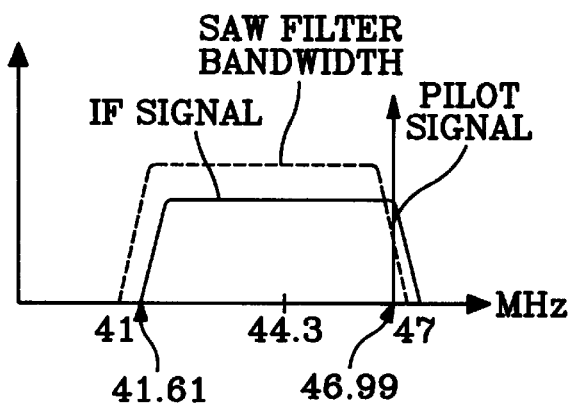
FIG. 4 is a frequency spectrum diagram illustrating a pilot signal of an intermediate frequency (IF) signal existing within an end portion of a bandwidth of a surface acoustic wave (SAW) filter in the case that a carrier wave tuning is shifted.

The double conversion tuner 2 and a numerically controlled oscillator (hereinafter, referred to as "NCO") 58 are controlled so that the IF signal outputted from the double conversion tuner 2 is converted to the IF signal of FIG. 3 when the frequency deviates by as much as 0.3 MHz as illustrated in FIG. 4. Embodiments for controlling the double conversion tuner 2 will be described with reference to FIGS. 2 and 8. Additionally, embodiments for controlling the NCO 58 will be described with reference to FIGS. 9 and 10. In the above-described situation of frequency deviation of the IF signal, the deviation is corrected by shifting the tuning of the double conversion tuner 2 by an amount equal to the frequency deviation and in a direction opposite to the frequency deviation. This shifting and tuning is accomplished by controlling an output frequency of the VCO 78 inputted to the double conversion tuner 2 as a local oscillation signal LO2. Also, it is accomplished by controlling the local oscillation signal of the NCO 58. If the double conversion tuner 2 is shifted and tuned by the local oscillation signal LO2, the frequency of the pilot signal of the IF signal actually becomes 46.39 MHz as illustrated in FIG. 5 (the frequency of the pilot signal is 46.69 MHz in the case that the carrier wave tuning is ideal). Accordingly, the pilot signal of 46.39 MHz is safely situated within the filtering bandwidth of the SAW filter 4.

Figure 2:
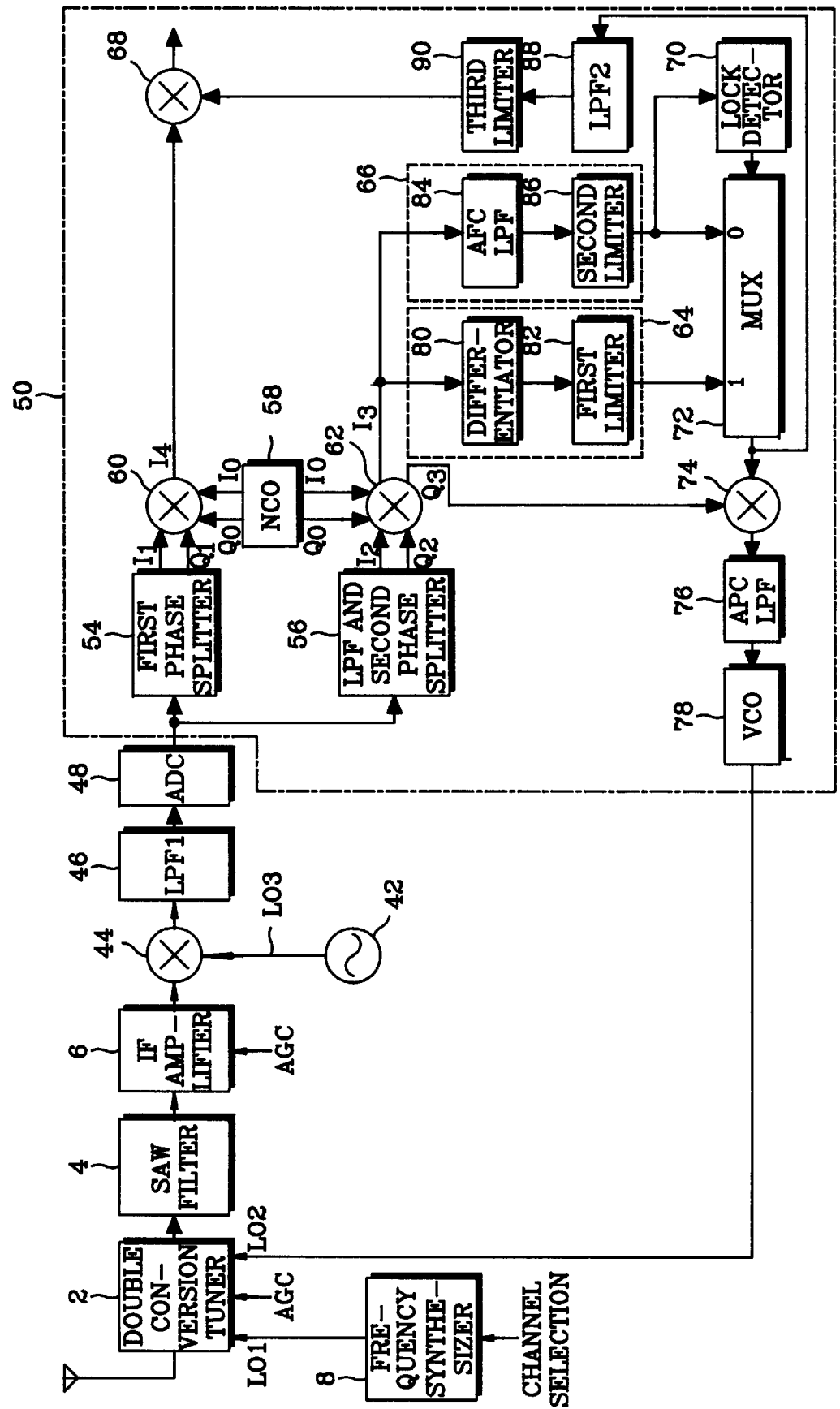
FIG. 2 is a view illustrating a tuning unit, an intermediate frequency (IF) unit and a carrier wave restoring device (that is, a frequency & phase locked loop (FPLL)) according to the present invention.
Figure 5:
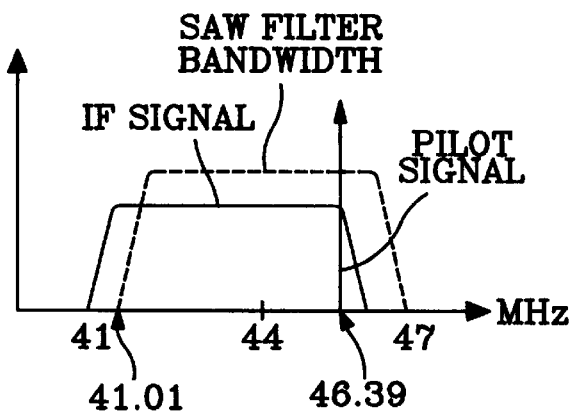
FIG. 5 is a frequency spectrum diagram illustrating a pilot signal which is located sufficiently within a bandwidth of a surface acoustic wave (SAW) filter as a result of a carrier wave tuning compensation in preparation for shifting of a carrier wave tuning.

FIG. 2 illustrates construction of an embodiment of the present invention which causes the IF signal of FIG. 4 outputted from the double conversion tuner 2 to have the form of the IF signal shown in FIG. 5.

Figure 1:
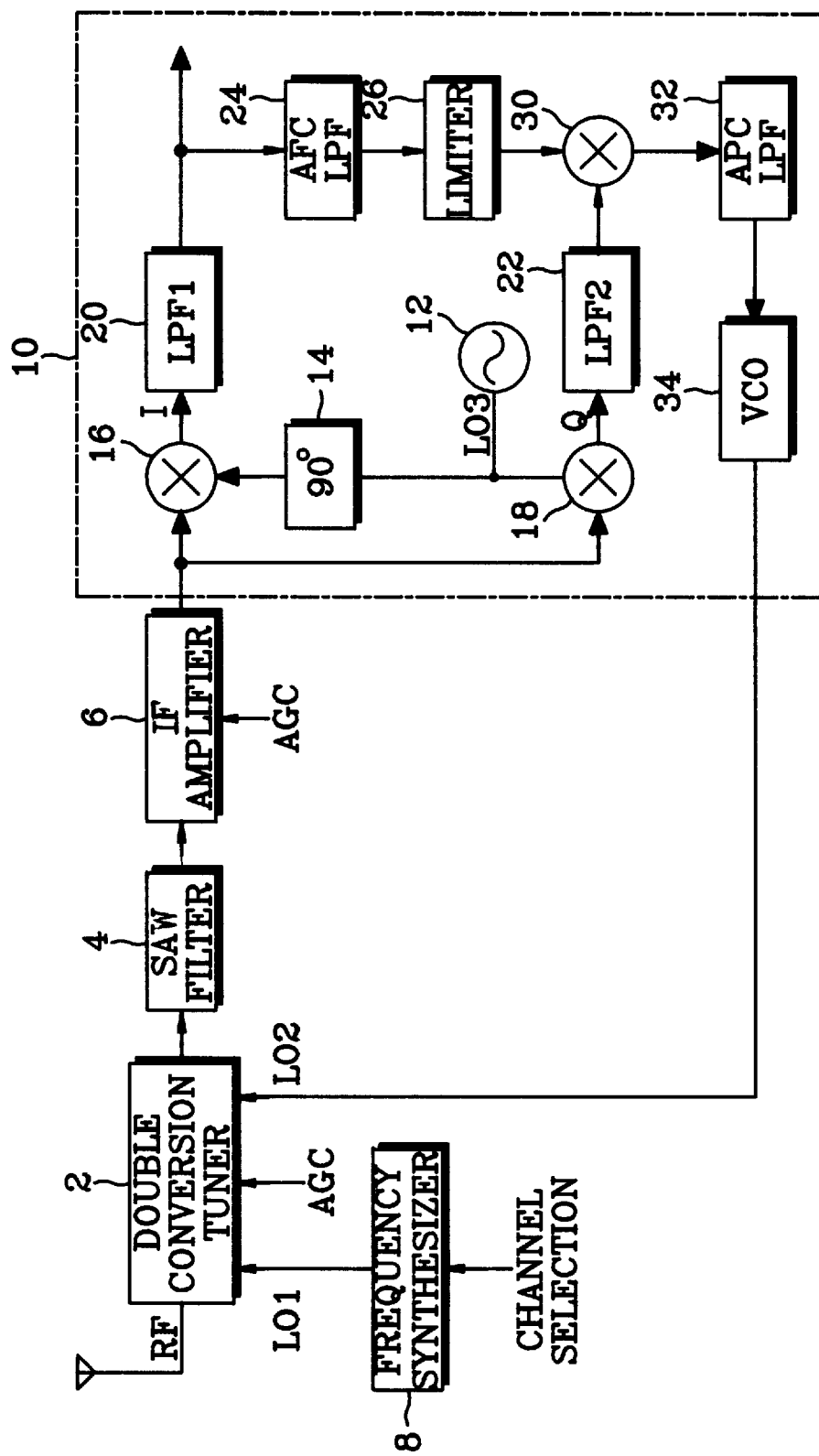
FIG. 1 is a view illustrating a tuning unit, an intermediate frequency (IF) unit and a carrier wave restoring device (that is, a frequency & phase locked loop (FPLL)) of a United States 8-level vestigial side-band (VSB) high definition television receiver.

FIG. 2 illustrates a tuning unit, an IF unit, and a carrier wave restoring device (that is, an FPLL) of the receiver according to the present invention. In FIG. 2, the construction of the double conversion tuner 2, the SAW filter 4 and the IF amplifier 6 are identical to those of FIG. 1.

Figure 6:
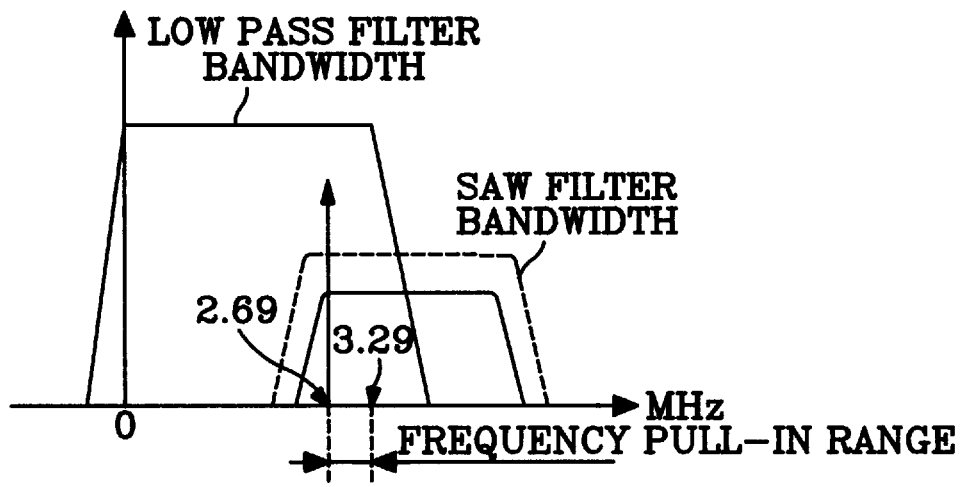
FIG. 6 is a frequency spectrum diagram illustrating a range in which a carrier wave restoring device can detect a pilot signal by a bandwidth of a surface acoustic wave (SAW) filter and a bandwidth of a low pass filter in the case that a carrier wave tuning is ideal such as in FIG. 3.

The IF signal amplified in the IF amplifier 6 is multiplied (tuned) in the mixer 44 with the local oscillation signal LO3 generated from a third local oscillator 42, and is thereby frequency-converted to a signal close to the baseband. In the present invention, one embodiment will be described in which the pilot signal of 46.69 MHz outputted from the mixer 44 as illustrated in FIG. 3, is frequency-converted to the pilot signal of 2.69 MHz as illustrated in FIG. 6. In other words, the frequency of the local oscillation signal LO3 of the third local oscillator 42 is a sum of 46.69 MHz and 2.69 MHz. The secondary harmonic component (the video frequency component) is eliminated from the output signal of the mixer 44 through the first low pass filter 46, and then the output signal of the first low pass filter 46 is converted to a digital signal through an analog-to-digital converter (hereinafter, referred to as "A/D converter") 48. And then, the converted digital signal is applied to the carrier wave restoring device 50. The third local oscillator 42 and the mixer 44 are units for converting the frequency band of the signal to a low frequency band in order to make it possible to digitally process the signal in the A/D converter 48.

The carrier wave restoring device 50 according to the present invention is comprised of a phase splitter 54, a low pass filter and phase splitter 56, the NCO 58, mixers 60 and 62, a frequency error quick response detector 64, a frequency error precision detector 66, a lock detector 70, a multiplexer 72, a mixer 74, APC LPF 76 and the VCO 78.

The digital signal converted in the A/D converter 48 is split into complex signals $I_1$ and $Q_1$ through the first phase splitter 54. Additionally, the complex signals $I_1$ and $Q_1$ are multiplied with complex signals $I_0$ and $Q_0$ of an oscillation frequency of the NCO 58 which is fixed in the mixer 60, and are frequency-converted to the baseband. At this time, the first phase splitter 54 performs Hilbert conversion, to thereby output the complex signals $I_1$ and $Q_1$ therefrom.

Also, the digital signal converted in the A/D converter 48 is split into complex signals $I_2$ and $Q_2$ through the low pass filter and second phase splitter 56. Additionally, the complex signals $I_2$ and $Q_2$ are multiplied with the complex signals $I_0$ and $Q_0$ of the oscillation frequency of the NCO 58 which is fixed in the mixer 62, to thereby be frequency-converted to the baseband. In this embodiment, the fixed oscillation frequency of the NCO 58 is 2.69 MHz as the frequency value for converting the pilot frequency of the input signal of the A/D converter 48 to the baseband. Among the complex signal components $I_0$ and $Q_0$ of the 2.69 MHz oscillation frequency outputted from the NCO 58, the $I_0$ is a signal for a real component and the $Q_0$ is a signal for an imaginary component.

In the low pass filter and second phase splitter 56, the Hilbert conversion is performed in the second phase splitter, and a signal limited to a specific low-band passes through the low pass filter. It is desired that a tap length of a delay element of the low pass filter is set to be equal to the delay time of the first phase splitter 54 of the upper signal path. Accordingly, the two signals multiplied in the mixers 60 and 62 are positioned at the same point in time. As one example of the low pass filter according to the present invention, the filtering bandwidth of 0~3.29 MHz is illustrated in FIG. 6. The filtering bandwidth can be varied according to the required frequency pull-in range.

The complex signals $I_2$ and $Q_2$ outputted from the low pass filter and second phase splitter 56 are multiplied with the complex signals $I_0$ and $Q_0$ of the NCO 58 fixed in the mixer 62, to thereby be frequency-converted to the baseband. At this time, it is in the mixer 62 that the multiplied complex signals $I_2$ and $Q_2$ are converted to the baseband frequency generated from the positive frequency side band.

In the case that the carrier wave tuning is ideal as in FIG. 3, the frequency band (the frequency pull-in range) of the signal outputted from the mixer 62 is between 2.69 MHz and 3.29 MHz as illustrated in FIG. 6. At this time, the pilot signal is 2.69 MHz and is positioned at an edge of the frequency pull-in range.

Among the complex signals $I_3$ and $Q_3$ outputted from the mixer 62, in-phase component $I_3$ is simultaneously applied to the frequency error quick response detector 64 and the frequency error precision detector 66.

The frequency error quick response detector 64 is comprised of a differentiator 80 and a first limiter 82. The differentiator 80 differentiates the in-phase component signal $I_3$ outputted from the mixer 62, and the first limiter 82 limits the signal differentiated in the differentiator 80, to thereby output the limited signal as +1 or −1 signal therefrom. The differentiator 80 performs well in the case that the frequency offset is large, thereby to assure fast convergence of the carrier wave restoring device 50.

Accordingly, in the case that the frequency error is large (in the case that the $I_3$ signal is positioned toward a high frequency as the frequency error is large), the limiter 82 alternatively outputs +1 and −1 signals therefrom.

The frequency error precision detector 66 is comprised of the AFC LPF 84 and the second limiter 86. The in-phase component signal $I_3$ outputted from the mixer 62 is low pass-filtered (integrated) in the AFC LPF 84, and the low pass-filtered signal is limited in the second limiter 86, thereby to output the limited signal as +1 or −1 signal therefrom. In the case that the frequency offset is small, the AFC LPF 84 performs well and removes a noise component which might cause a malfunction to thereby assure precise convergence of the carrier wave restoring device 50. Accordingly, in the case that the frequency error is small (in the case that the $I_3$ signal is positioned toward a low frequency as the frequency error is small), the second limiter 86 alternatively outputs +1 and −1 signals therefrom.

The output signal of the first limiter 82 and the output signal of the second limiter 86 are respectively applied to input terminals 1 and 0 of a multiplexer 72. The output signal of the second limiter 86 is also applied to a lock detector 70. The lock detector 70 checks a period at which the output signal of the second limiter 86 is transferred from +1 signal to −1 signal (or from −1 signal to +1 signal), thereby to select the input terminal of the multiplexer 72. If the transfer period is smaller than a critical period previously set (that is, if the frequency error is large), the lock detector 70 causes the multiplexer 72 to select the input terminal 1. However, if the frequency error is gradually decreased and the transfer period between +1 and −1 of the output signal of the second limiter 86 is lengthened so that it becomes larger than the predetermined critical period, the lock detector 70 causes the multiplexer 72 to select the input terminal 0. Selecting the input terminal 0 means that an output signal $I_4$ of the mixer 60 is frequency-locked.

Accordingly, the multiplexer 72 selects the input terminal 1 when the frequency error is large, and selects the input terminal 0 when the frequency error is small. As a result, the output value of the multiplexer 72 differs according to the size of the detected frequency error. If there is no frequency error or if the frequency error is entirely eliminated, the output signal of the multiplexer 72 is fixed to a value of +1 or −1. The output value of the multiplexer 72 is applied to the mixer 74 and the low pass filter 88.

The mixer 74 mixes a signal Q3 outputted from the mixer 62 with the output signal of the multiplexer 72, and outputs the mixed signal therefrom. The value of the signal Q3 outputted from the mixer 62 represents the phase error. The phase error is generated after the frequency error correction is completed. Accordingly, in the case that there is the frequency error, the signal Q3 does not matter.

First, it will be assumed that the output value of the multiplexer 72 (that is, the frequency error detection degree) is large. The signal Q3 outputted from the mixer 62 and the output signal of the multiplexer 72 are mixed in the mixer 74, and then are applied to the VCO 34 through the APC LPF 76.

Accordingly, the VCO 78 controls the frequency of the pilot signal and the frequency of the demodulated signal to be the same, and also controls the carrier wave tuning frequency to be shifted. In other words, the pilot signal is controlled to be shifted from 46.69 MHz as shown in FIG. 3 to 46.39 MHz as shown in FIG. 5 (the pilot signal is 46.69 MHz such as in FIG. 3 in the case that the carrier wave tuning is ideal).

A controlled value of the VCO 78 is applied to the double conversion tuner 2 as the local oscillation signal LO2. In the situation shown in FIGS. 3 and 5, the value of the local oscillation signal LO2 includes a frequency control value component which is added to enable the frequencies to coincide at 0.3 MHz. Accordingly, the double conversion tuner 2 converts the frequency by the local oscillation signal LO2, thereby to perform the tuning.

Figure 7:
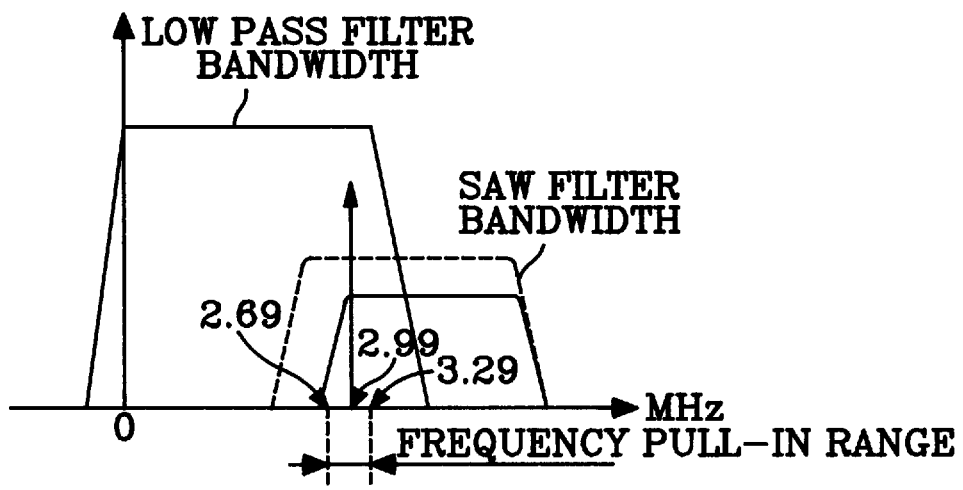
FIG. 7 is a frequency spectrum diagram illustrating a situation in which a compensation process, such as that depicted in FIG. 5, is performed so that a pilot signal is located sufficiently within the required range for detection by a carrier wave restoring device.

FIG. 7 is a frequency spectrum diagram illustrating a range in which the carrier wave restoring device can detect the pilot signal by compensating as illustrated in FIG. 5.

FIG. 7 illustrates that the local oscillation signal LO2 is shifted an amount equal to or greater than the frequency deviation of the IF signal in a direction opposite to the deviation, so that the pilot signal is positioned at a center of the frequency pull-in range.

The carrier wave restoring device 50 continuously performs the frequency error correction by repeating the above operation.

Next, if the frequency of the pilot signal and the frequency of the demodulated signal are brought into harmony, the value of the output signal of the multiplexer 72 of the carrier wave restoring device 50 is fixed at +1 or −1. At this time, only the Q3 output signal of the mixer 62 acts in the mixer 74, so that the carrier wave restoring device 50 acts as a PLL. Therefore, the output signal of the mixer 74 passes through the APC LPF 76, and then controls the VCO 78 in order to eliminate a vestigial phase error in the VCO 78. If so, the VCO 78 correspondingly applies the local oscillation signal LO2 to the double conversion tuner 2.

It is ideal that the output signal of the multiplexer 72 is maintained as +1 or −1 signal after the carrier wave restoring is completed. But, in the case that the signal-to-noise ratio (S/N ratio) characteristic is not good, that is, when the signal has a significant noise component, the output signal of the multiplexer 72 is inverted.

In order to maintain the lock even in the above case, the signal outputted from the multiplexer 72 is low pass-filtered in a second low pass filter 88, is limited in a third limiter 90, and then is applied to a multiplier 68. In the case that the characteristic of the S/N ratio is consistently good, the second low pass filter 88 and the third limiter 90 are not required.

The multiplier 68 multiplies an in-phase signal $I_4$ passing through the mixer 60 with the signal outputted from the third limiter 90, thereby to output the multiplied signal therefrom. When the frequency is fully locked to the pilot signal, the output signal of the third limiter 90 is +1 in the case that the phase is not shifted and the output signal of the third limiter 90 is −1 in the case that the phase is shifted by 180°. Therefore, the multiplier 68 again inverts the phase of the in-phase signal $I_4$ in the case that the phase is shifted by 180°. The output signal of the multiplier 68 is transmitted to a next signal processor of the receiver.

As discussed above, the pull-in range can be determined by initially controlling the deviated frequency degree of the double conversion tuner 2 and a delivery characteristic of the low pass filter and second phase splitter 56 according to the present invention.

Figure 8:
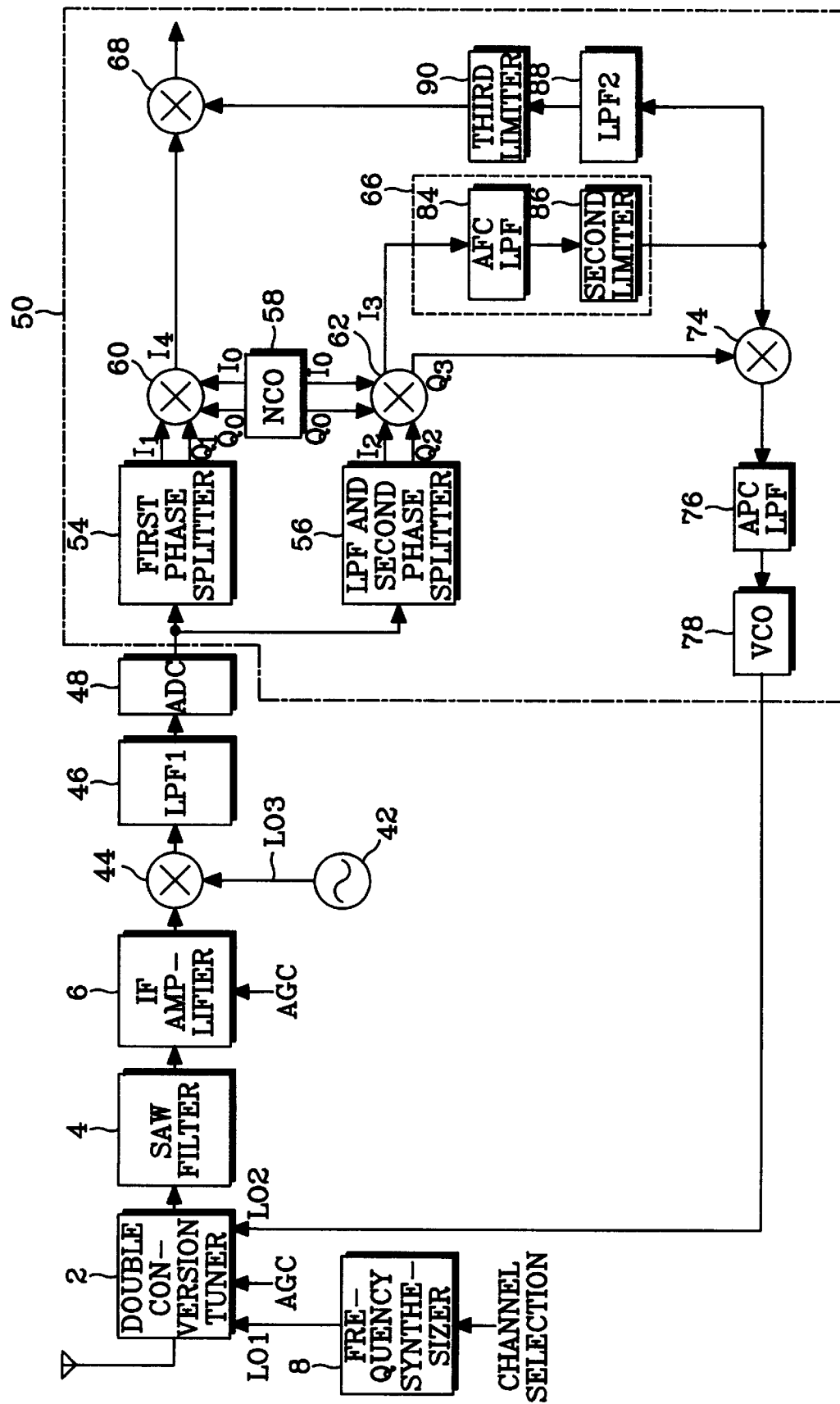
FIGS. 8 to 10 are views illustrating various embodiments for a carrier wave restoring device according to the present invention.
Figure 9:
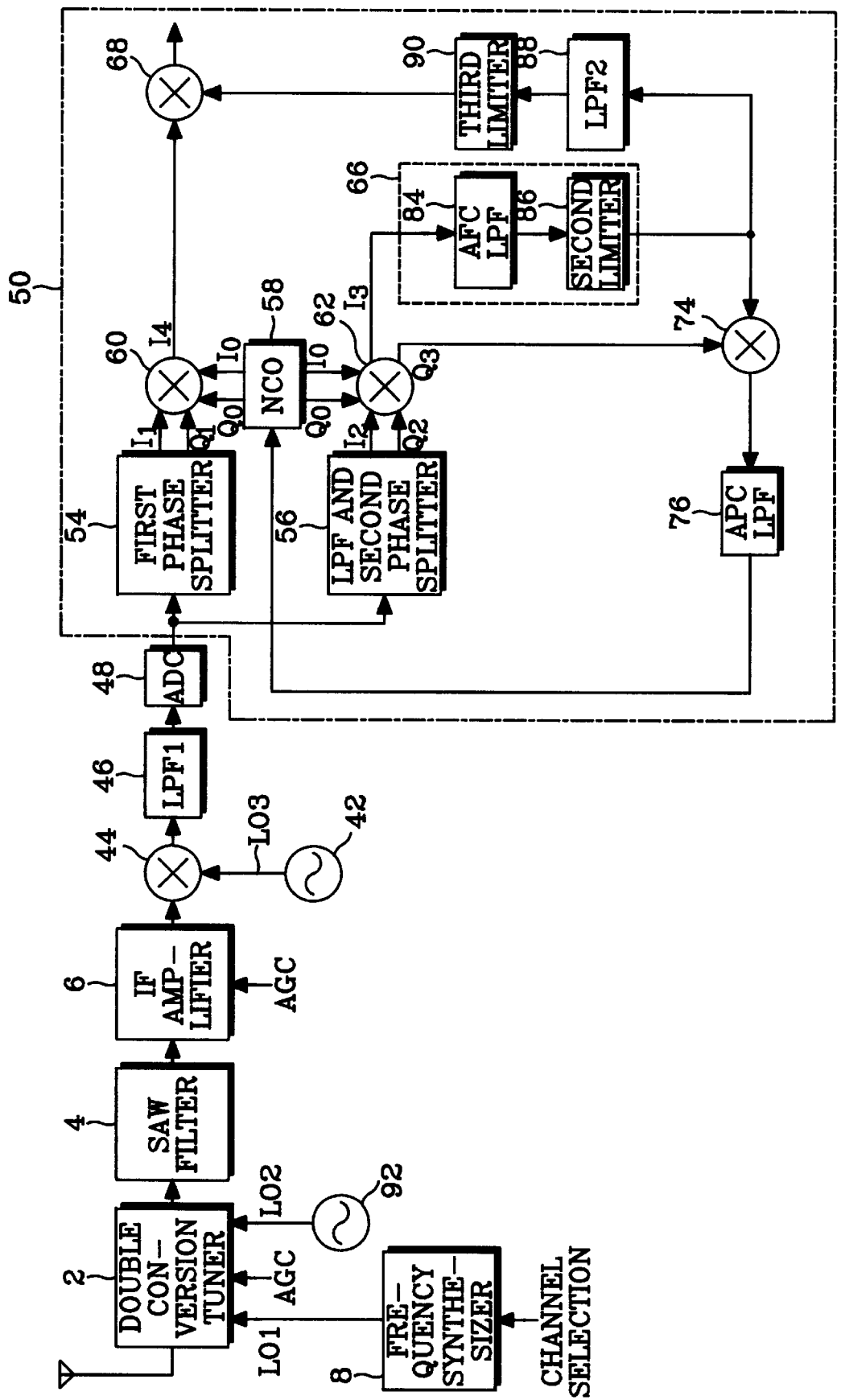
Figure 10:
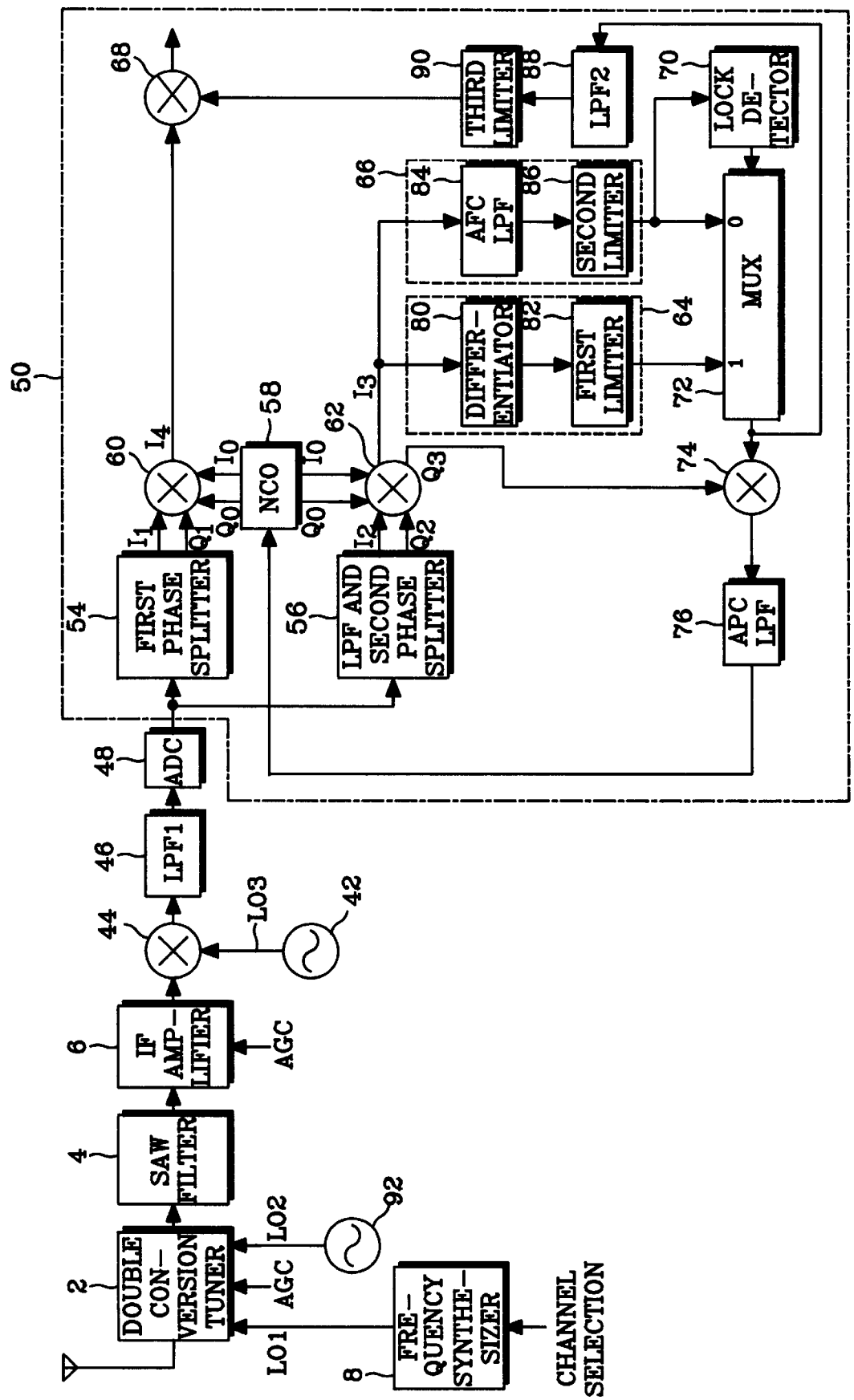

FIGS. 8 to 10 are views illustrating various embodiments for the carrier wave restoring device 50 according to the present invention.

In the embodiment of FIG. 8, the frequency error quick response detector 64 (that is, the differentiator 80 and the first limiter 82), the lock detector 70 and the multiplexer 72 are omitted. The embodiment of FIG. 8 has the disadvantage of a longer carrier wave restoring time than that of the embodiment of FIG. 2, but has the advantage of simple construction.

The embodiment of FIG. 9 is characterized in that the second local oscillator 92 for generating the second local oscillation signal LO2 is utilized as a fixing oscillator. At this time, the frequency of the second local oscillator 92 is initially deviated and set in the opposite direction by an amount equal to the deviation of the frequency of the double conversion tuner 2. In other words, in the case that the deviated frequency of the double conversion tuner 2 does initially matter as illustrated in FIG. 4, the second local oscillation signal LO2 is shifted in the opposite direction. Additionally, in the embodiment of FIG. 9, the NCO 58 of the carrier wave restoring device 50 is characterized in that the oscillation frequency value is variable according to the output value of the APC LPF 76. The carrier wave restoring device 50 is constructed as in the embodiment of FIG. 8. The embodiment of FIG. 9 is advantageous in that the entire carrier wave restoring device 50 can be fabricated as one integrated circuit (IC). In the same manner of the embodiment of FIG. 9, the embodiment of FIG. 10 is characterized in that the second local oscillator 92 for generating the second local oscillation signal LO2 is utilized as the fixing oscillator. Also, the NCO 58 of the carrier wave restoring device 50 is characterized in that the oscillation frequency value is varied according to the output value of the APC LPF 76. However, the carrier wave restoring device 50 of FIG. 10 is constructed as in the embodiment of FIG. 2. Accordingly, the embodiment of FIG. 10 has the following advantages: the entire carrier wave restoring device 50 can be digitalized and fabricated as one IC, and the carrier wave can be restored in a short time.

As discussed above, the carrier wave restoring device according to the present invention has an advantage of previously performing the frequency-conversion by shifting the frequency by an amount equal to and in a direction opposite to a frequency deviation, so that the pilot signal can be securely positioned within the bandwidth corresponding to the baseband of the SAW filter bandwidth and the bandwidth of the low pass filter, in preparation for shifting of the carrier wave tuning, so that only the frequency band of the carrier wave signal passes.

While there have been illustrated and described what are considered to be preferred embodiments of the present invention, it will be understood by those skilled in the art that various changes and modifications may be made, and equivalents may be substituted for elements thereof without departing from the true scope of the present invention.

What is claimed is:

1. A digital carrier wave restoring device of a telecommunication receiving system utilizing a pilot signal, comprising:

a tuning unit for receiving a radio signal including said pilot signal, and tuning said radio signal to a first tuning frequency corresponding to a channel selected by a user, thereby to output an intermediate frequency signal therefrom;

a filter for filtering said intermediate frequency signal to a specific frequency bandwidth through which said pilot signal passes;

a first frequency converter for frequency-converting an output signal of said filter to a digital signal processing frequency band;

a signal converter for converting an output signal of said first frequency converter to a digital signal;

a first phase splitter for phase-splitting said digital signal, thereby to output a first I signal and a first Q signal therefrom;

a low pass filter and second phase splitter for low pass-filtering and phase-splitting said digital signal, thereby to output a second I signal and a second Q signal therefrom;

a second frequency converter for mixing said first I signal and said first Q signal with a fixed local oscillation frequency, thereby to output a first I signal and a first Q signal of a baseband therefrom;

a third frequency converter for mixing said second I signal and said second Q signal with said fixed local oscillation frequency, thereby to output a second I signal and a second Q signal of a baseband therefrom; and a tuning correcting unit for detecting a frequency error by said pilot signal of said second I signal of said baseband and detecting a phase error from said second Q signal of said baseband, thereby to generate an error correction value for correcting said frequency error and said phase error, and for applying to said tuning unit a second tuning frequency which is obtained by adding a preliminary correction frequency value prepared for an initial shifting of said first tuning frequency to said error correction value, thereby to cause said tuning unit to correct said first tuning frequency.

2. The digital carrier wave restoring device as claimed in claim 1, wherein said tuning correcting unit comprises:

a frequency error quick response detector for detecting a frequency error by said pilot signal of said second I signal of said baseband when said frequency error is large, thereby to output a first error detection value therefrom for causing a quick frequency error correction;

a frequency error precision detector for detecting said frequency error by said pilot signal of said second I signal of said baseband, thereby to output a second error detection value therefrom for causing a precise frequency error correction when said frequency error is small;

an error detection selection controller having a frequency error critical value previously set, and outputting a first selection control signal in response to said second error detection value being larger than said critical value and a second selection control signal in response to said second error detection value being smaller than said critical value therefrom;

an error detection selecting unit for selecting said first error detection value in response to said first selection control signal, and for selecting said second error detection value in response to said second selection control signal;

a mixer for mixing said first error detection value or said second error detection value which is selected in said error detection selecting unit, with said second Q signal of said baseband, thereby to output a frequency error and phase error detection value therefrom;

a second tuning frequency generator for generating an error correction value from said frequency error and phase error detection value, and for adding a preliminary correction frequency value prepared for an initial shifting of said first tuning frequency to said error correction value, thereby to output said second tuning frequency therefrom; and a phase state correcting unit for correcting, by an output value of said error detection selecting unit, a phase state of a first I signal outputted from a second frequency converter of a baseband when a frequency error and a phase error are not generated.

3. The digital carrier wave restoring device as claimed in claim 2, wherein said frequency error quick response detector comprises:

a differentiator for differentiating and outputting said second I signal of said baseband; and a limiter for limiting and outputting an output signal of said differentiator.

4. The digital carrier wave restoring device as claimed in claim 2, wherein said frequency error precision detector comprises:

a low pass filter for low pass-filtering and outputting said second I signal of said baseband; and a limiter for limiting and outputting an output signal of said low pass filter.

5. The digital carrier wave restoring device as claimed in claim 1, wherein said tuning correcting unit comprises:

a frequency error detector for detecting a frequency error by said pilot signal of said second I signal of said baseband, thereby output an error detection value therefrom;

a mixer for mixing said error detection value with said second Q signal of said baseband, thereby to output a frequency error and phase error detection value;

a second tuning frequency generator for generating an error correction value from said frequency error and phase error detection value, and adding a preliminary correction frequency value prepared for an initial shifting of said first tuning frequency to said error correction value, thereby to output said second tuning frequency therefrom; and a phase state correcting unit for correcting, by an error detection value, a phase state of a first I signal outputted from a second frequency converter of a baseband when a frequency error and a phase error is not generated.

6. The digital carrier wave restoring device as claimed in claim 5, wherein said frequency error detector comprises:

a low pass filter for low pass filtering and outputting said second I signal of said baseband; and a limiter for limiting and outputting an output signal of said low pass filter.

7. A digital carrier wave restoring device of a telecommunication receiving system utilizing a pilot signal, comprising:

a tuning unit for receiving a radio signal including said pilot signal, and for adding a first tuning frequency corresponding to a channel selected by a user with a preliminary correction frequency prepared for an initial shifting of said first tuning frequency and tuning said radio signal to a second tuning frequency, thereby to output an intermediate frequency signal therefrom;

a filter for filtering said intermediate frequency signal to a specific frequency bandwidth through which said pilot signal passes;

a first frequency converter for frequency-converting an output signal of said filter to a digital signal processing frequency baseband;

a signal converter for converting an output signal of said first frequency converter to a digital signal; a first phase splitter for phase-splitting said digital signal, thereby to output a first I signal and a first Q signal therefrom;

a low pass filter and second phase splitter for low pass-filtering said digital signal, thereby to output a second I signal and a second Q signal therefrom;

a second frequency converter for mixing said first I signal and said first Q signal with a local oscillation frequency, thereby to output a first I signal and a first Q signal of a baseband therefrom;

a third frequency converter for mixing said second I signal and said second Q signal with said local oscillation frequency, thereby to output a second I signal and a second Q signal of a baseband therefrom; and a tuning correcting unit for detecting a frequency error by said pilot signal of said second I signal of said baseband and detecting a phase error from said second Q signal of said baseband, and generating an error correction value for correcting said frequency error and said phase error, thereby to correct said local oscillation frequency.

8. The digital carrier wave restoring device as claimed in claim 7, wherein said tuning correcting unit comprises:

a frequency error quick response detector for detecting a frequency error by said pilot signal of said second I signal of said baseband when the frequency error is large, thereby to output a first error detection value for causing a quick frequency error correction;

a frequency error precision detector for detecting said frequency error by said pilot signal of said second I signal of said baseband when said frequency error is small, thereby to output a second error detection value for causing a precise frequency error correction;

an error detection selection controller having a frequency error critical value previously set, and outputting a first selection control signal in response to said second error detection value being larger than said critical value and a second selection control signal in response to said second error detection value being smaller than said critical value;

an error detection selecting unit for selecting said first error detection value in response to said first selection control signal, and for selecting said second error detection value in response to said second selection control signal;

a mixer for mixing a first error detection value or a second error detection value which is selected in said error detection selecting unit, with said second Q signal of said baseband, thereby to output a frequency error and phase error detection value as said local oscillation frequency therefrom; and a phase state correcting unit for correcting, by an output value of said error detection selector, a phase state of said first I signal outputted from a second frequency converter of said baseband when a frequency error and a phase error are not generated.

9. The digital carrier wave restoring device as claimed in claim 8, wherein said frequency error quick response detector comprises:

a differentiator for differentiating said second I signal of said baseband; and a limiter for limiting and outputting an output signal of said differentiator.

10. The digital carrier wave restoring device as claimed in claim 8, wherein said frequency error precision detector comprises:

a low pass filter for low pass-filtering and outputting said second I signal of said baseband; and a limiter for limiting and outputting an output signal of said low pass filter.

11. The digital carrier wave restoring device as claimed in claim 7, wherein said tuning correcting unit comprises:

a frequency error detector for detecting the frequency error by said pilot signal of said second I signal of said baseband, thereby to output the error detection value therefrom;

a mixer for mixing said error detection value with said second Q signal of said baseband, thereby to output a frequency error and phase error detection value as said local oscillation frequency; and a phase state correcting unit for correcting, by said error detection value, a phase state of said first I signal outputted from said second frequency converter of said baseband when a frequency error is not generated.

12. The digital carrier wave restoring device as claimed in claim 11, wherein said frequency error detector comprises:

a low pass filter for low pass-filtering and outputting said second I signal of said baseband; and a limiter for limiting and outputting an output signal of said low pass filter.

13. A method for restoring a carrier wave in a television receiver utilizing a telecommunication system which carries a pilot signal with said carrier wave, comprising the steps of:

tuning a received radio signal including said pilot signal to an intermediate frequency signal by a first tuning frequency previously set;

filtering said intermediate frequency signal to only a specific frequency band through which said pilot signal passes;

first frequency-converting said specific frequency band filtered signal to a digital signal processing frequency band;

converting said first frequency-converted output signal to a digital signal;

phase-splitting said digital signal to thereby output a first I signal and a first Q signal, and low pass-filtering and phase-filtering said digital signal to thereby output a second I signal and a second Q signal;

second frequency-converting by mixing said first I signal and said first Q signal with a fixed local oscillation frequency to thereby output a first I signal and a first Q signal of a baseband, and mixing said second I signal and said second Q signal with said fixed local oscillation frequency to thereby output a second I signal and a second Q signal of said baseband; and detecting a frequency error by said pilot signal of said second I signal of said baseband and detecting a phase error from said second Q signal of said baseband, thereby to generate an error correction value for correcting said frequency error and said phase error, and adding a preliminary correction frequency value prepared for an initial shifting of said first tuning frequency with said error correction value, thereby controlling to correct said first tuning frequency.

14. A method for restoring a carrier wave in a television receiver utilizing a telecommunication system which carries a pilot signal with said carrier wave, comprising the steps of:

receiving a radio signal including said pilot signal, and adding a first tuning frequency corresponding to a channel selected by a user with a preliminary correction frequency prepared for an initial shifting of said first tuning frequency and tuning said radio signal to a second tuning frequency, thereby to output an intermediate frequency signal therefrom;

filtering said intermediate frequency signal to a specific frequency bandwidth through which said pilot signal passes;

first frequency-converting said filtered signal to a digital signal processing frequency band;

converting said first frequency-converted signal to a digital signal;

phase-splitting said digital signal to thereby output a first I signal and a first Q signal, and low pass-filtering and phase-splitting said digital signal to thereby output a second I signal and a second Q signal;

second frequency-converting by mixing said first I signal and said first Q signal with a local oscillation frequency, thereby to output a first I signal and a first Q signal of a baseband, and mixing said second I signal and said second Q signal with said local oscillation frequency, thereby to output a second I signal and a second Q signal of said baseband; and detecting a frequency error by said pilot signal of said second I signal of said baseband and detecting a phase error from said second Q signal of said baseband in order to generate an error correction value for correcting said frequency error and said phase error, thereby to correct said local oscillation frequency.

* * * * *